United States Patent [19]

Liao et al.

[11] Patent Number: 5,385,676

[45] Date of Patent: * Jan. 31, 1995

[54] WATER SOLUBLE GRAFT COPOLYMERS FOR PAINT SPRAY BOOTH SLUDGE DEWATERING

[75] Inventors: Wen P. Liao, Warminster; Deborah L. Purnell, Philadelphia, both of Pa.

[73] Assignee: Betz Laboratories, Inc., Trevose, Pa.

[ * ] Notice: The portion of the term of this patent subsequent to May 18, 2010 has been disclaimed.

[21] Appl. No.: 100,903

[22] Filed: Aug. 3, 1993

Related U.S. Application Data

[60] Continuation-in-part of Ser. No. 773, Jan. 5, 1993, Pat. No. 5,298,566, which is a division of Ser. No. 691,206, Apr. 25, 1991, Pat. No. 5,211,854.

[51] Int. Cl.$^6$ .................. C02F 1/56; C08F 265/10
[52] U.S. Cl. .................. 210/734; 525/260; 525/263; 525/269; 525/291; 525/293; 525/285; 525/296; 525/301; 525/303; 525/308; 210/930
[58] Field of Search .............. 210/734; 525/260, 263, 525/269, 291, 293, 285, 296, 301, 303, 308

[56] References Cited

U.S. PATENT DOCUMENTS

| | | | |
|---|---|---|---|
| 3,284,393 | 11/1966 | Vanderhoff et al. | 526/207 |
| 3,711,573 | 1/1973 | Nagg | 210/734 |
| 3,869,418 | 3/1975 | Peterson et al. | 260/29.7 |
| 3,899,471 | 8/1975 | Lorenz et al. | 210/734 |
| 3,951,791 | 4/1976 | Huang et al. | 210/734 |
| 3,993,712 | 11/1976 | Guilbault | 210/734 |
| 4,152,507 | 5/1979 | Shibahara et al. | 210/734 |
| 4,191,645 | 3/1980 | Begula, Jr. et al. | 210/734 |
| 4,271,053 | 6/1981 | Kelsey et al. | 260/29.2 EP |
| 4,400,496 | 8/1983 | Butler et al. | 527/312 |
| 4,599,390 | 7/1986 | Fan et al. | 210/734 |
| 4,835,206 | 5/1989 | Furrar et al. | 525/296 |
| 4,835,234 | 5/1989 | Valint et al. | 526/258 |
| 4,916,191 | 4/1990 | Takeuchi et al. | 526/276 |
| 5,108,622 | 4/1992 | Liao et al. | 210/734 |
| 5,211,854 | 5/1993 | Liao et al. | 210/734 |

FOREIGN PATENT DOCUMENTS 0356241 2/1990 European Pat. Off.

OTHER PUBLICATIONS

"Hawley's Condensed Chemical Dictionary", 11th ed., New York, Van Nostrand Reinhold, 1987, p. 224.
Smirnova et al., Journal of Polymer Science, vol. 29, pp. 139-145, 1991, "Complexing Effect in the Reaction of Graft Polymerization Proceeding by the Coordination-Radical Mechanism with the Participation of Copper Ions".

*Primary Examiner*—Vasu S. Jagannathan
*Attorney, Agent, or Firm*—Alexander D. Ricci; Philip H. Von Neida; Gregory M. Hill

[57] ABSTRACT

A method of dewatering paint spray booth sludge by adding to the water system of a paint spray booth a water soluble graft copolymer having the structure:

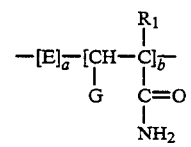

wherein E is the repeat unit obtained after polymerization of an, ethylenically unsaturated compound, the molar percentage of a:b is from about 95:5 to 5:95, with the proviso that the sum of a and b equals 100%; G comprises the structure:

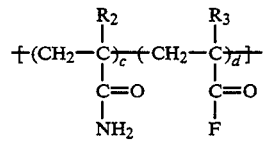

wherein d is a cationic monomer, $R_1$, $R_2$ and $R_3$ are the same or different and are hydrogen or a lower alkyl group having $C_1$ to $C_3$, F is the salt of an ammonium cation and the molar percentage of c:d is from 95:5 to 5:95 with the proviso that the sum of c and d equals 100%.

14 Claims, No Drawings

WATER SOLUBLE GRAFT COPOLYMERS FOR PAINT SPRAY BOOTH SLUDGE DEWATERING

This is a continuation-in-part of application Ser. No. 08/000,773, filed Jan. 5, 1993, now U.S. Pat. No. 5,298,566 which is a divisional of application Ser. No. 7/691,206, filed Apr. 25, 1991, now U.S. Pat. No. 5,211,854.

FIELD OF THE INVENTION

The present invention pertains to novel water soluble graft copolymers which are useful for water treatment, such as sludge dewatering and water clarification. Specifically they are useful for dewatering sludge from industrial paint spray operations.

BACKGROUND OF THE INVENTION

There is an increasing usage of water soluble polymers and copolymers in wastewater treatment industries. These compounds have shown desirable utility for the purpose of dewatering sludge and clarifying contaminated water.

When paint is detackified in a wet paint spray booth recirculating water system, the killed paint forms a sludge that may disperse, sink, or float in the system. It is important, in most systems, that the treated paint be removed from the water as quickly and as efficiently as possible. A build up of treated paint could cause foaming problems and reduce the effectiveness of the detackification program. The detackification program should control dispersion, sinking or floating of the killed paint.

Paint spray booth sludge water typically includes resin, pigment, some soluble solvent and paint detackification treatment chemicals. Solids generally range from about 0.5% to 50%. The sludge may result from detackified solvent based and/or water based paints. The pH of the paint spray booth sludge water will depend upon the pH of the detackification program and will generally fall between 6.0 and 12.0. However, it would more probably fall between 7.0 and 9.0.

The treatment of the sludge is dependent upon the design of the sludge removal system. Most often, the sludge is transferred to a separate unit designed to float and dewater the sludge. A high molecular weight polymer is fed directly to this unit to enhance flotation and coagulation, which produces a disposable sludge that is high in solids. The dryness of the sludge is critical to the cost of disposing it. Its classification as hazardous or non-hazardous waste is also dependent on the dryness of the sludge. Paint booth sludge is generally sent to a landfill.

The efficacies of the polymers or copolymers used will vary depending upon the type of monomers chosen to form the polymer or copolymer, the molecular weight of the synthesized molecule and, in the case of a copolymer, the placement of the selected monomers on the backbone of the copolymer. It is the latter characteristic that is the focus of the present invention.

High molecular weight emulsion polymers have been successful in dewatering paint spray booth sludge. This invention describes novel high molecular weight polymers that have proven to be more effective than the currently used emulsion polymers. These polymers are novel in that the charged quaternary nitrogens are primarily on the grafts rather than on the backbone of the polymer. The distribution of the charge has made a dramatic difference in the amount of polymer required to float and coagulate the paint sludge.

Polymers with long sequences of two monomers can be categorized as block copolymers or graft copolymers. In graft copolymers sequences of one monomer are "grafted" onto a "backbone" of the second monomer type,

```
---AAA---AAA---AAA---, etc.
    B      B      B
    B      B      B
```

It is an object of this invention to prepare distinctive water soluble graft copolymers for paint sludge dewatering applications.

DETAILED DESCRIPTION OF THE INVENTION

The present invention pertains to novel water soluble graft copolymers which are useful for water treatment, such as sludge dewatering and water clarification. These copolymers are more efficacious in dewatering paint spray booth sludges than previously used polymers.

Specifically, the graft polymers in the invention contain polymeric segments obtained from the polymerization of acrylamide and cationic monomers which are attached or "grafted" to another polymer chain which is comprised of the repeating units of one or more monomers. The resulting graft copolymers are soluble in an aqueous medium.

The graft copolymer of the invention has the general structure:

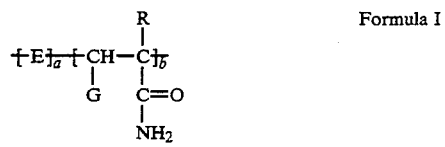

Formula I wherein E in the above formula (Formula I) is the repeat unit obtained after polymerization of an α, β ethylenically unsaturated compound, preferably carboxylic acid, amide form thereof, alkyl (C1–C8) ester or hydroxylated alkyl (C1–C8) ester of such carboxylic acid. Compounds encompassed by E include the repeat unit obtained after polymerization of acrylamide, methacrylamide, acrylic acid, methacrylic acid, maleic acid or anhydride, styrene sulfonic acid, 2-acrylamido-2-methylpropyl sulfonic acid, itaconic acid, and the like. Ester derivatives of the above mentioned acids such as 2-hydroxypropyl acrylate, methyl methacrylate, and 2-ethylhexyl acrylate, are also within the purview of the invention.

The molar percentage of a:b is from about 95:5 to 5:95, with the proviso that the sum of a and b equals 100%.

G in the above formula (Formula I) is a polymeric segment comprising repeat units having the structure:

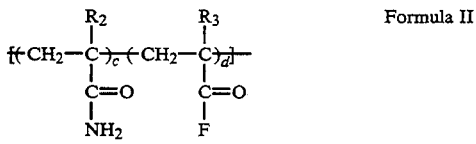

Formula II wherein $R_1$, $R_2$ and $R_3$ in Formulae I and II are the same or different and are hydrogen or a lower alkyl group having $C_1$ to $C_3$. F in the above formula is a salt of an ammonium cation, such as $NHR_3N^+R_{(4,5,6)}$ $M^-$ or $OR_3N^+R_{(4,5,6)}$ $M^-$, wherein $R_3$ is a $C_1$ to $C_4$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkylaromatic group; and M is an anion, such as chloride, bromide, or methyl or hydrogen sulfate. Typical cationic monomers are 2-acryloyloxyethyltrimethylammonium chloride (AETAC), 3-methacrylamidopropyl-trimethylammonium chloride (MAPTAC), 2-methacryloyloxyethyltrimethylammonium chloride (METAC) and diallyldimethylammonium chloride (DADMAC), etc.

It is to be understood that more than one kind of cationic monomer may be present in Formula II.

The molar percentage c:d in Formula II may vary from 95:5 to 5:95, with the proviso, however, the sum of c and d equals 100%.

There is no limit to the kind and mole percent of the monomers chosen so long as the total adds up to 100 mole % and the resulting copolymers are water soluble.

At present, the preferred water soluble graft copolymer for use in paint spray booth sludge dewatering is:

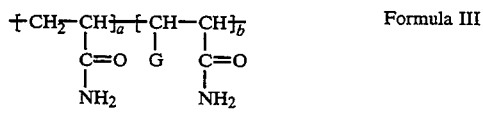

Formula III

The molar percentage of a:b is from about 95:5 to 5:95, with the proviso that the sum of a and b equals 100%. G in Formula III is:

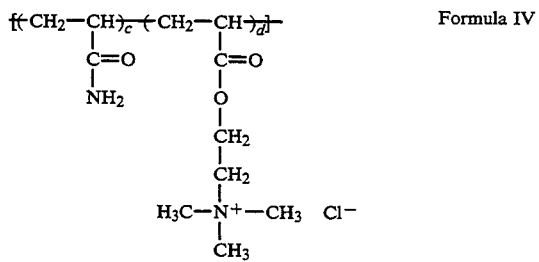

Formula IV

Monomer d is 2-acryloyloxyethyltrimethylammonium chloride (AETAC). The molar percentage c:d in the polymer segment G (Formula IV) is the ratio of Acrylamide:AETAC. It may fall within the range between 95:5 and 5:95. The sum of c and d must add up to 100%.

The number average molecular weight (Mn) of the polymeric segment G is not critical and. may fall within the range of 1,000 to 1,000,000. Preferably, the number average molecular weight will be within the range of 5,000 to 500,000, with the range of about 10,000 to about 200,000 being even more desirable. The key criterion is that the resulting graft copolymer be water soluble.

The graft copolymer is prepared via a two-step polymerization process. First, a macromonomer comprised of acrylamide and AETAC is prepared by a solution polymerization method using peroxide as an initiator. The initiator may be selected from peroxides, persulfates, bromates, and azo-type initiators such as 2,2'azobis-(2-amidinopropane) dihydrochloride, 2,2'-azobis-(2,4-dimethylvaleronitrile). Copper (II) sulfate is added in the process as an oxidative chain transfer agent to generate a terminal unsaturated double bond in the polymer chain. It is conceivable that transition metal ions other than copper, such as iron, cobalt, and nickel etc., may be used in the invention.

Ethylenediamine tetraacetic acid or diethylenetriamine pentaacetic acid and their salts are used as chelating agents to chelate copper prior to the second polymerization step.

The resulting macromonomer is then copolymerized with acrylamide or other monomers to form graft copolymers by a water-in-oil inverse emulsion technique. Such processes have been disclosed in U.S. Pat. No. 3,284,393, U.S. Pat. Nos. Re. 28,474 and 28,576, herein incorporated by reference. The resulting copolymer may also be further isolated by precipitating it in an organic solvent such as acetone and dried to a powder form. The powder can be easily dissolved in an aqueous medium for use in desired applications.

Branching agents such as polyethyleneglycol di(meth)acrylate, N,N'-methylenebis(meth)acrylamide, N-vinyl acrylamide, allyl glycidyl ether, glycidyl acrylate and the like may also be added, providing the resulting graft copolymer is water soluble. Any of the well known chain transfer agents familiar to those who skilled in the art may be used to control the molecular weight. Those include, but are not limited to, lower alkyl alcohols such as isopropanol, amines, mercaptans, phosphites, thioacids, formate, allyl alcohol and the like.

Conventional initiators such as peroxide, persulfate, along with sulfite/bisulfite and azo compounds may be used depending on the system chosen.

High HLB inverting surfactants such as those described in U.S. Pat. No. Re. 28,474 are then added to the emulsion to convert the resulting emulsion to a "self-inverting" emulsion. Using the procedure described herein, a unique graft copolymer in emulsion form is obtained.

It is to be understood that the aforementioned polymerization methods do not in any way limit the synthesis of copolymers according to this invention.

The resulting emulsion disperses and dissolves rapidly into an aqueous solution upon addition to water. Within minutes, a maximum solution viscosity is obtained. The emulsion dissolves well even in water containing a high level of hardness and it also retains most of its solution viscosity in brine water.

The structure of the graft copolymer is substantiated by a conventional solution viscosity study and $C^{13}$ NMR spectroscopy. The molecular weight of the resulting graft copolymer is not critical, as long as it is soluble in water. The molecular weight may vary over a wide range, e.g., 10,000–30,000,000 and may be selected depending upon the desired application. The invention finds its greatest usefulness in sludge dewatering when the acrylamide copolymers have molecular weights in excess of 1,000,000.

The graft copolymer of the present invention is much more effective at lower concentrations than other sludge dewatering polymers. The amount that should be added to the paint spray booth sludge is in the range of 0.1 to 100 ppm, by weight. Surprisingly, however, effective treatment concentrations may be between 0.1 and 30 ppm, by weight.

EXAMPLES

Tests were conducted to show the paint spray booth sludge dewatering efficacy of the inventive copoymers.

Two graft copolymers were produced by the process disclosed above. Example 1 contains 10% AETAC and 90% acryamide. Example 2 contains 20% AETAC and 80% acrylamide.

Comparative copolymers were prepared with acrylamide and AETAC monomers by employing a polymerization process which yielded linearly configured molecules having the charges residing primarily in the polymer backbone. Comparative Example A contains 20% AETAC and 80% acrylamide. Comparative Example B contains 52% AETAC and 48% acrylamide.

In the following test, the performance of the resulting water soluble graft copolymers described in this invention is demonstrated. A Capillary Suction Time (CST) device was used to measure the dewatering performance of the various polymers on paint spray booth sludge. The CST device consists of an electronic timer, a plexiglass cell holder containing two concentric electrodes, and a tall stainless steel cylindrical cell. The device operates by measuring the drainage of water from a sludge substrate out of the cell. This is accomplished by placing the cell holder containing the two electrodes on a piece of Whatman #17 chromatography paper, 7.0×9.0 cm in size. The tall cylinder is then placed in the hole in the cell holder. The cell holder is connected to the electronic timer, which is turned on and reset. A 7 ml aliquot of the substrate is introduced into the cell. As the water migrates out of the cell, it is absorbed onto the chromatography paper. This results in a migration of a water front through the paper. As the water advances, it contacts the first electrode, activating the timer. Continued advancement of the water eventually reaches the second electrode, completing the circuit and shutting off the timer. The process is repeated for several polymer dosages. A dosage response curve plotting CST time (in seconds) versus polymer dosage gives an indication of a particular polymer's effectiveness in dewatering a substrate. The dosage curve minimum is an indication of the optimum polymer dosage, while the extent of the trough gives a measure of the polymer's tendency to overdose. Overdosing is observed when the CST values increase with increasing polymer dosage. Generally, the treatment which produces the lowest CST value at the lowest dosage is the most effective.

The capillary suction tester is a useful initial screening tool for determining the best polymer for dewatering a particular sludge. Table 1 lists the amount of polymer that was required to provide good dewatering results. The amount of polymer required to effectively dewater the sludge was much lower for Examples 1 and 2 compared to Comparative Examples A and B. The lower the capillary suction time (CST) the better the dewatering. Dewatering performance is presented in Table I.

TABLE 1

| Treatment | ppm | CST(seconds) |
|---|---|---|
| Blank | — | 11.5 |
| Example 1 | 10 | 8.9 |
| Example 2 | 10 | 9.6 |
| Comparative Example A | 40 | 8.2 |
| Comparative Example B | 40 | 8.9 |

The graft copolymers of the invention were as effective as the more conventional acrylamide/AETAC copolymers but at about one quarter the concentration. Therefore, much less of the graft copolymers may be employed for the purpose of dewatering paint spray booth sludge.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method of dewatering paint spray booth sludge in the recirculating water system of a paint spray booth comprising adding to the water from about 0.1 to 100 ppm, by weight, of a water soluble graft copolymer having the structure:

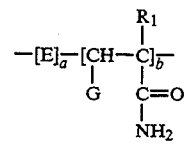

wherein E is the repeat unit obtained after polymerization of an $\alpha, \beta$ ethylenically unsaturated compound, the molar percentage of a:b is from about 95:5 to 5:95, with the proviso that the sum of a and b equals 100%; G comprises the structure:

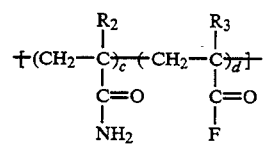

wherein $R_1$, $R_2$ and $R_3$ are the same or different and are hydrogen or a lower alkyl group having $C_1$ to $C_3$, F is the salt of an ammonium cation and the molar percentage of c:d is from 95:5 to 5:95 with the proviso that the sum of c and d equals 100%.

2. The method of claim I wherein the $\alpha, \beta$ ethylenically unsaturated compound is selected from the group consisting of a carboxylic acid, the amide form thereof, the alkyl (C1-C8) ester thereof and the hydroxylated alkyl (C1-C8) ester thereof.

3. The method of claim 2 wherein the $\alpha, \beta$ ethylenically unsaturated compound is selected from the group consisting of acrylamide, methacrylamide, acrylic acid, methacrylic acid, maleic acid, maleic anhydride, styrene sulfonic acid, 2-acrylamido-2-methylpropyl sulfonic acid, itaconic acid, 2-hydroxypropyl acrylate, methyl methacrylate and 2-ethylhexyl acrylate.

4. The method of claim 1 wherein F is selected from the group consisting of $NHR_3N^+R_{(4,5,6,)}M^-$, wherein $R_3$ is a $C_1$ to $C_4$ linear or branched alkylene group, $R_4$, $R_5$ and $R_6$ are selected from the group consisting of hydrogen, $C_1$ to $C_4$ linear or branched alkyl, $C_5$ to $C_8$ cycloalkyl, aromatic or alkyl-aromatic group, and $M^-$ is an anion selected from the group consisting of chloride, bromide, methyl sulfate and hydrogen sulfate.

5. The method of claim 4 wherein the cationic monomer is selected from the group consisting of 2- acryloyloxyethyltrimethylammonium chloride, 3-methacrylamidopropyltrimethylammonium chloride, 2-methacryloyloxyethyltrimethylammonium chloride and diallyldimethylammonium chloride.

6. The method of claim 1 having the structure:

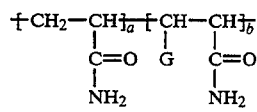

wherein the molar percentage a:b is from about 95:5 to 5:95, with the proviso that the sum of a and b equals 100%, and G has the structure:

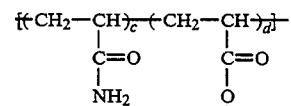

7. The method of claim 1 wherein the number average molecular weight of G is from about 1,000 to about 1,000,000.

8. The method of claim 7 wherein the number average molecular weight of G is from about 5,000 to about 500,000.

9. The method of claim 8 wherein the number average molecular weight of G is from about 10,000 to about 200,000.

10. The method of claim 1 wherein the copolymer has a number average molecular weight of from about 10,000 to 39,000,000.

11. The method of claim 10 wherein the copolymer has a number average molecular weight of from about 1,000,000 to 30,000,000.

12. The method of claim 1 wherein the paint spray booth sludge contains resin, pigment and solvent.

13. The method of claim 1 wherein the paint spray booth sludge comprises a solids content of from about 0.5% to 50%.

14. The method of claim 1 wherein the paint spray booth water system has a pH of from about 6.0 to 12.0.

* * * * *